United States Patent [19]

Onda

[11] Patent Number: 5,719,954
[45] Date of Patent: Feb. 17, 1998

[54] STEREO MATCHING METHOD AND DISPARITY MEASURING METHOD

[75] Inventor: Katsumasa Onda, Yokohama, Japan

[73] Assignee: Matsushita Electric Industrial Co., Ltd., Osaka, Japan

[21] Appl. No.: 460,712

[22] Filed: Jun. 2, 1995

[30] Foreign Application Priority Data

Jun. 7, 1994 [JP] Japan .................... 6-125346

[51] Int. Cl.⁶ .............. G06K 9/00; G06K 9/48; G06K 9/32; G01B 11/14
[52] U.S. Cl. .............. 382/154; 382/199; 382/291; 356/376
[58] Field of Search ............. 382/154, 190, 382/199, 201, 291; 356/376, 2

[56] References Cited

U.S. PATENT DOCUMENTS

| | | | |
|---|---|---|---|
| 4,825,393 | 4/1989 | Nishiya | 364/560 |
| 5,179,441 | 1/1993 | Anderson et al. | 358/88 |
| 5,220,441 | 6/1993 | Gerstenberger | 358/487 |
| 5,479,535 | 12/1995 | Komatsu | 382/199 |
| 5,606,627 | 2/1997 | Kuo | 382/154 |

FOREIGN PATENT DOCUMENTS

| | | | |
|---|---|---|---|
| 360217472A | 10/1985 | Japan | G06K 9/36 |
| 405189570A | 7/1993 | Japan | G06F 15/70 |

OTHER PUBLICATIONS

Onoue et al, "Image Processing Handbook", published by Shokodo Publishing Company, pp. 1–11 and 392–398.

Saneyoshi et al, "Drive Assist System by Means of 3-D Image Recognition Technique", Oct. 1992, Release of Lectures No. 924, pp. 169–172.

Mclauchlan et al, "Stereoscopic Recovery and Description of Smooth Textured Surfaces", Proceedings of the British Machine Vision Conference, Oxford, GB, pp. 20–26, Sep. 24–Jul. 1990.

Patent Abstracts of Japan, vol. 10, No. 80 (P–441), JP–A–60 217472, Oct. 31, 1985.

Patent Abstracts of Japan, vol. 10, No. 80 (P–441), 29 Mar. 1986 & JP–A–60 217472 (Hitachi Seisakusho KK), 31 Oct. 1985.

Braunegg, "Stereo Feature Matching in Disparity Space", Proceedings of the IEEE International Conference on Robotics and Automation, Cincinnati, US, May 13–18, 1990, IEE Computer Society Press, Los Alamitos, US, pp. 796–803.

*Primary Examiner*—Andrew Johns
*Assistant Examiner*—Monica S. Davis
*Attorney, Agent, or Firm*—Watson Cole Stevens Davis, P.L.L.C.

[57] ABSTRACT

A method for measuring stereo image disparity between right and left stereo images for each of two-dimensional blocks having a rectangular shape. In particular, the method includes the steps of deciding a level of each pixel in the right and left stereo images according to a ternary value, sequentially setting a one-dimensional window having a size of N pixels along a horizontal direction in one of the right and left stereo images by overlapping N/2 pixels, determining the disparity for each one-dimensional window by determining a portion in the other of the right and left stereo images corresponding to each one-dimensional window on the basis of the ternary value obtained through the deciding step to generate a histogram of the disparities, and determining the stereo image disparity for each of the two-dimensional blocks on the basis of the histogram of the disparities.

21 Claims, 12 Drawing Sheets

FIG. 7A
WINDOW SCAN
(FOR EACH OBJECT
SCANNING LINE)
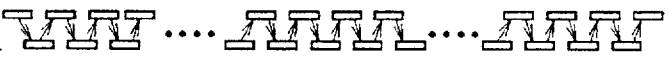
FIG. 7B
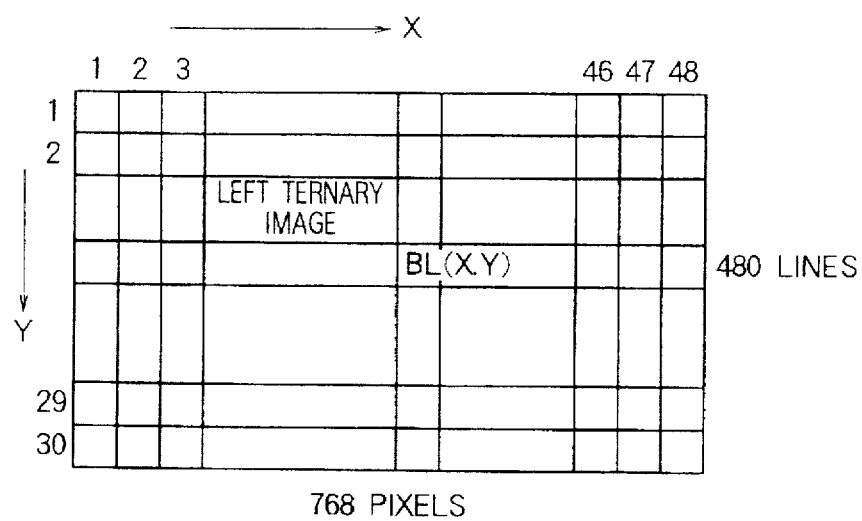
FIG. 7C
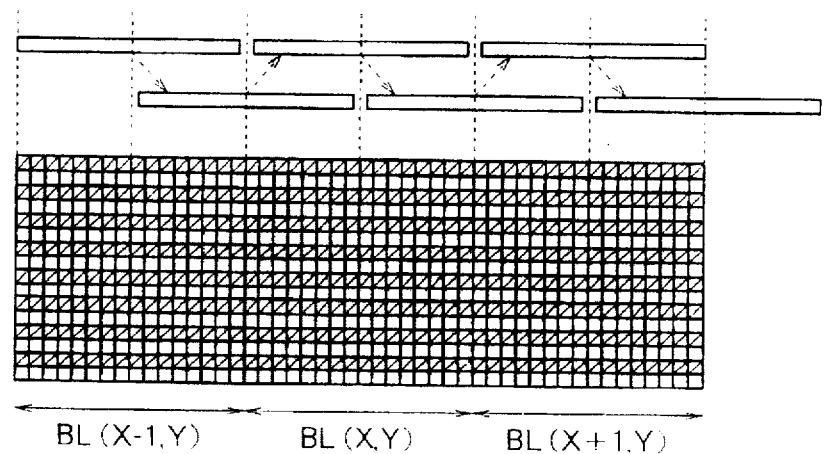
 MATCHED ONLY FOR HATCHED SCANNING
LINES (OBJECT SCANNING LINES)

LEFT TERNARY IMAGE

RIGHT TERNARY IMAGE

| TERNARY IMAGE IN LEFT WINDOW | 1 | 1 | 1 | 1 | 1 | 0 | 0 | 0 | 0 | 0 | -1 | -1 | -1 | -1 | -1 |
|---|---|---|---|---|---|---|---|---|---|---|---|---|---|---|---|
| TERNARY IMAGE IN RIGHT WINDOW | 1 | 1 | 1 | 0 | 0 | 0 | 0 | 0 | 0 | -1 | -1 | -1 | -1 | -1 | -1 |
| COINCIDENCE EVALUATION | P | P | P | 0 | 0 | Z | Z | Z | Z | 0 | 0 | P | P | P | P |

| LEFT | 0 | 1 | -1 | OTHER COMBINATIONS |
|---|---|---|---|---|
| RIGHT | 0 | 1 | -1 | |
| EVALUATION | Z | P | P | 0 |

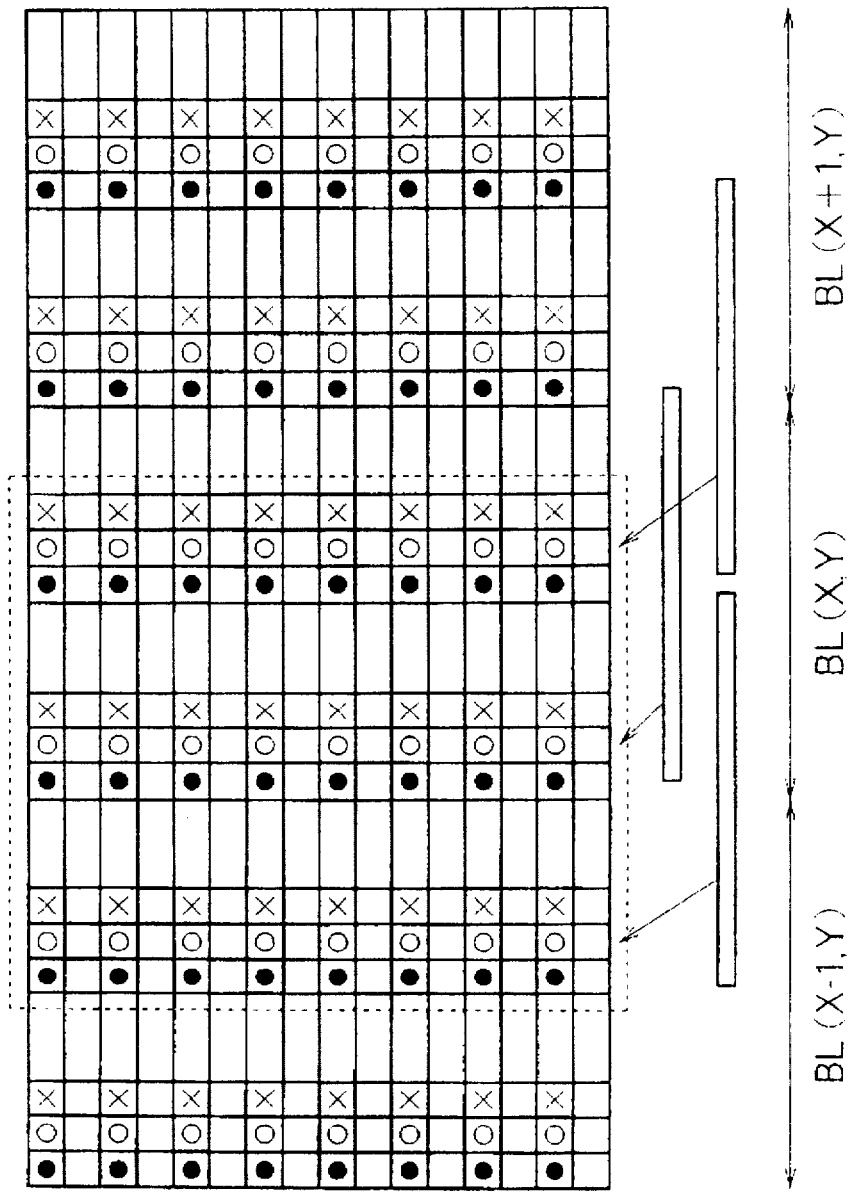

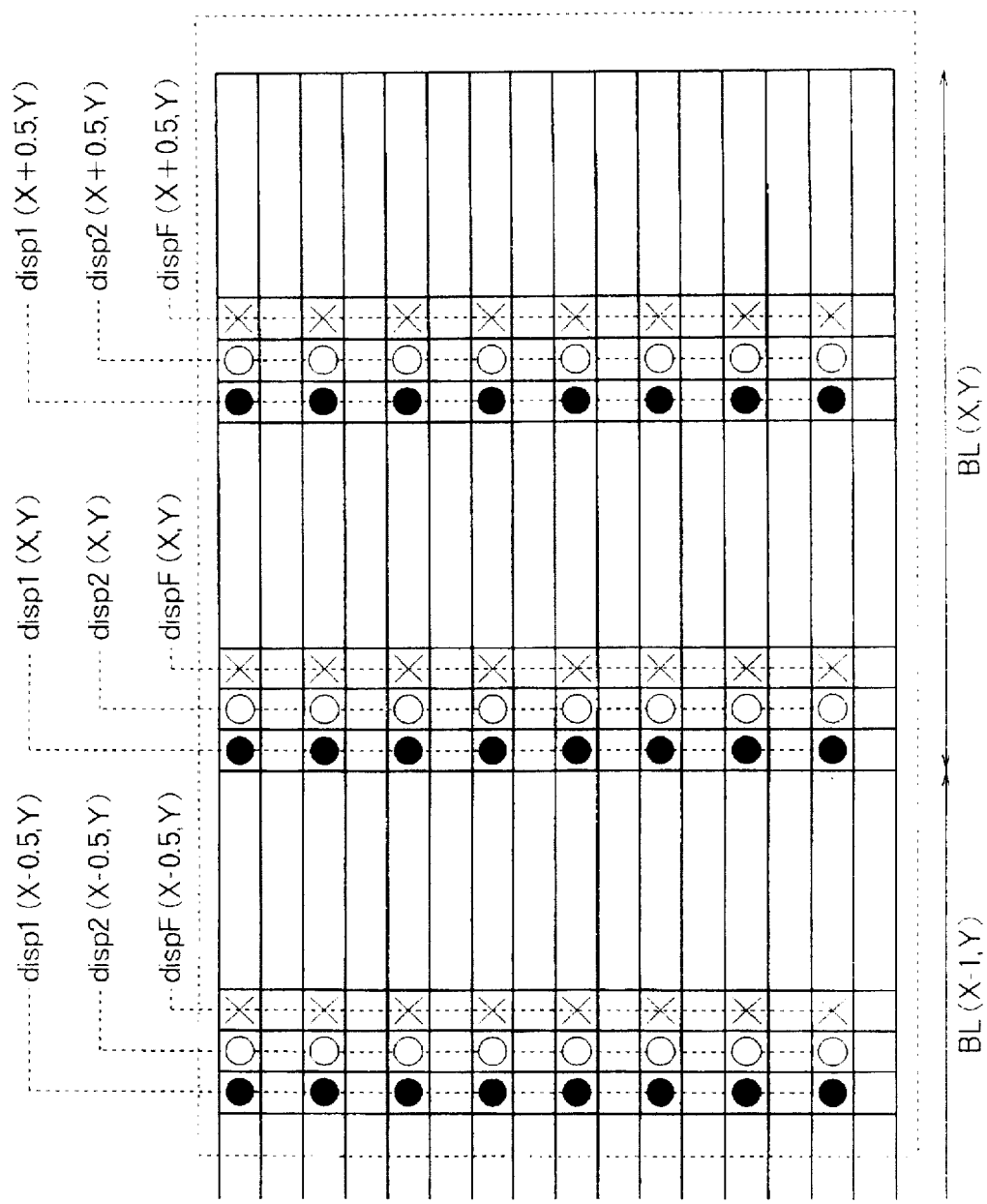

STEREO MATCHING METHOD AND DISPARITY MEASURING METHOD

BACKGROUND OF THE INVENTION

1. Field of the Invention

The present invention relates to a method of stereo matching and a method of measuring the disparity of stereo images, or more in particular to such methods applicable to various monitor systems including devices for detecting obstacles or intruders in a railway crossing.

2. Description of the Related Art

First, the principle of stereo image measurement will be described with reference to FIG. 1. FIG. 1 is plotted with x, y, z as the coordinates representing the real space, and X, Y as the coordinates representing the position on the image (imaging plane of the camera). In order to distinguish two cameras 10L and 10R, the coordinates $X_L$, $Y_L$ are used for representing the position on the image plane of the left camera, and the coordinates $X_R$, $Y_R$ for representing the position on the image plane of the right camera. The x axis is parallel to the $X_L$ axis and to the $X_R$ axis, and the y axis parallel to the $Y_L$ axis and to the $Y_R$ axis. The z axis is assumed to be parallel to the optical axis of the two cameras. The origin of the real space coordinate system is taken at the mid-point between the projection centers of the right and left cameras. The distance between the project centers is called the base line length, which is expressed as $2a$. Also, the distance between the projection center and the image plane (focal length) is expressed by f.

Now, suppose that a point p in the real space is projected on a point $P_L(X_L, Y_L)$ on the left image plane and a point $P_R(X_R, Y_R)$ on the right image plane respectively. These points $P_L$ and $P_R$ are present on the same scanning line. In stereo image measurement, $P_L$, $P_R$ are determined on the image planes, and the real space coordinate (x, y, z) of the point p is determined according to the principle of trigonometrical survey. In the present case, since the optical axes of the two cameras are on the same plane with the x axis parallel to the X axis, the $Y_L$ and $Y_R$ take the same value. The relation among the coordinates $X_L$, $Y_L$, $X_R$, $Y_R$ on the image planes and the coordinates x, y, z in the real space is given as:

$$x = \frac{a(X_L + X_R)}{X_L - X_R}, \ y = \frac{2aY_L}{X_L - X_R}, \ z = \frac{2af}{X_L - X_R} \quad (1)$$

or $$X_L = \frac{(x+a)f}{z}, \ X_R = \frac{(x-a)f}{z}, \ Y_L = Y_R = \frac{Yf}{z} \quad (2)$$

where $d = X_L - X_R$ \quad (3)

representing the disparity. The disparity d and the distance z take the relation of 1 to 1. Since $a>0$, equation (2) leads the following relation:

$$X_L > X_R \text{ and } Y_L = Y_R \quad (4)$$

This indicates that the point on an image plane matching or corresponding to another point on the other image plane is present on the same scanning line providing an epipolar line in the range of $X_L > X_R$. As a result, a point on an image plane matching a point on the other image can be found by checking the analogy of an image in a small region along a straight line where the matching points are likely to exist.

Now, a method of evaluating the analogy will be explained. As an example, the method described in "Image Processing Handbook" by Morio Onoue et al., published by Shokodo Publishing Company for checking the correlation between two images will be described with reference to FIG. 2. Assume that a small rectangular area n×m in size is set centered around picture elements for which a matching point is to be determined and that the internal brightness of the rectangular area is $I_L(i,j)$, $I_R(i,j)$ respectively. The mean and variance of brightness for the respective small areas are assumed to be $\mu_L$, $\mu_R$, $\sigma_L^2$, $\sigma_R^2$. The correlation values between these small areas are given by the following equation.

$$C = \frac{\sum_{j=1}^{m} \sum_{i=1}^{n} (I_L(i,j) - \mu_L)(I_R(i,j) - \mu_R)}{\sqrt{\sigma_L^2 \sigma_R^2}} \quad (5)$$

This value is computed along a straight line where a matching point is likely to exist, and a point associated with the maximum value is assumed to be a matching point. According to this method, a matching point can be determined by pixel, and once a matching point is determined, the disparity d can be determined immediately using equation (3) from the coordinate point of the matching point.

It is seen from the foregoing example that determination of a matching point requires a great amount of computations. In other words, it is necessary to execute the computations according to the above-mentioned equation over the whole area where a matching point is likely to be present with regard to all the pixels requiring determination of a matching point. The computation speed can be improved by reducing the size of the small area for determination of the correlation at the expense of image distortion or a greater effect of noises, thus deteriorating the stability for detection of a matching point. With the increase in size of the small area, by contrast, not only a longer computation time is required but also the change of the correlation value becomes extremely gentle for a deteriorated accuracy of matching point detection. The size of the small area is required to be set appropriately according to the properties of the images involved. Further, in this method, as obvious from equation (3), the result of the matching operation is immediately reflected in the disparity. Once an erroneous matching operation occurs, therefore, the error directly affects the disparity to be measured. An error in the matching operation thus constitutes a disparity error.

Other examples of the method for determining matching points between right and left images are described in "Drive Assist System by means of 3-D Image Recognition technique" by Saneyoshi et al., Release of Lectures No.924, pp.169–172 (Oct. 1992), issued by Society of Automotive Engineers of Japan, Inc., and "Development of Length-Measuring Algorithm Using Stereo Image Processing" by Sakagami, et al., Release of Lectures No.924, pp.153–156 (Oct. 1992), issued by Society of Automotive Engineers of Japan, Inc. These methods will not specifically be described herein.

The conventional methods of matching stereo images and the conventional methods of measuring the disparity of stereo images have the problem of an enormous time required for processing the computations and a very high hardware cost which make these methods impracticable.

SUMMARY OF THE INVENTION

In view of the above-mentioned problems, an object of the present invention is to provide a method of matching stereo images and determining the disparity of stereo images with as small an amount of computations as possible.

Another object of the invention is to provide a method of disparity measurement which is capable of absorbing errors which may occur in stereo.

In order to achieve the above-mentioned objects, according to the method of the present invention, edge components are extracted from the two images (stereo images) on the right and left sides and each edge component is decided into a ternary value such as "1", "0" or "–1" according to threshold values TH1, TH2. Thus, the right and left images having ternary values, that is, ternary images are matched. Further, the whole image is divided into blocks of, for example, N×M pixels in size, and the disparity is measured by block thereby to reduce the amount of computations considerably. In addition, in determining the disparity by block, a histogram is generated based on the disparity obtained by matching windows contained in the blocks, and a disparity at the histogram peak is used as the disparity of the blocks. In this way, the error which may occur in the matching each window and the resulting disparity are prevented from affecting the final block-based disparity measurements, thereby improving the reliability of the disparity measurement.

As described above, according to the method of stereo matching or measuring the disparity of stereo images of the present invention, the computation load is remarkably reduced as compared with the conventional methods. Therefore, the disparity for the whole screen can be measured within a short time from the sequential input of stereo images. Further, the system can be configured with low cost. In addition, the reliability of the final disparity measurement can be improved. As a consequence, it is possible to realize a practical apparatus for detecting obstacles or intruders in a railway crossing or other practical industrial monitors by continuously measuring the disparity and checking the disparity changes from the sequentially-input stereo images.

BRIEF DESCRIPTION OF THE DRAWINGS

FIGS. 7A to 7C are diagrams for explaining a method of setting windows constituting a unit of matching according to the invention.

FIGS. 11A and 11B are diagrams for explaining a method of determining the disparity of blocks constituting a unit for disparity determination according to the invention.

DESCRIPTION OF THE PREFERRED EMBODIMENTS

Figure 3:
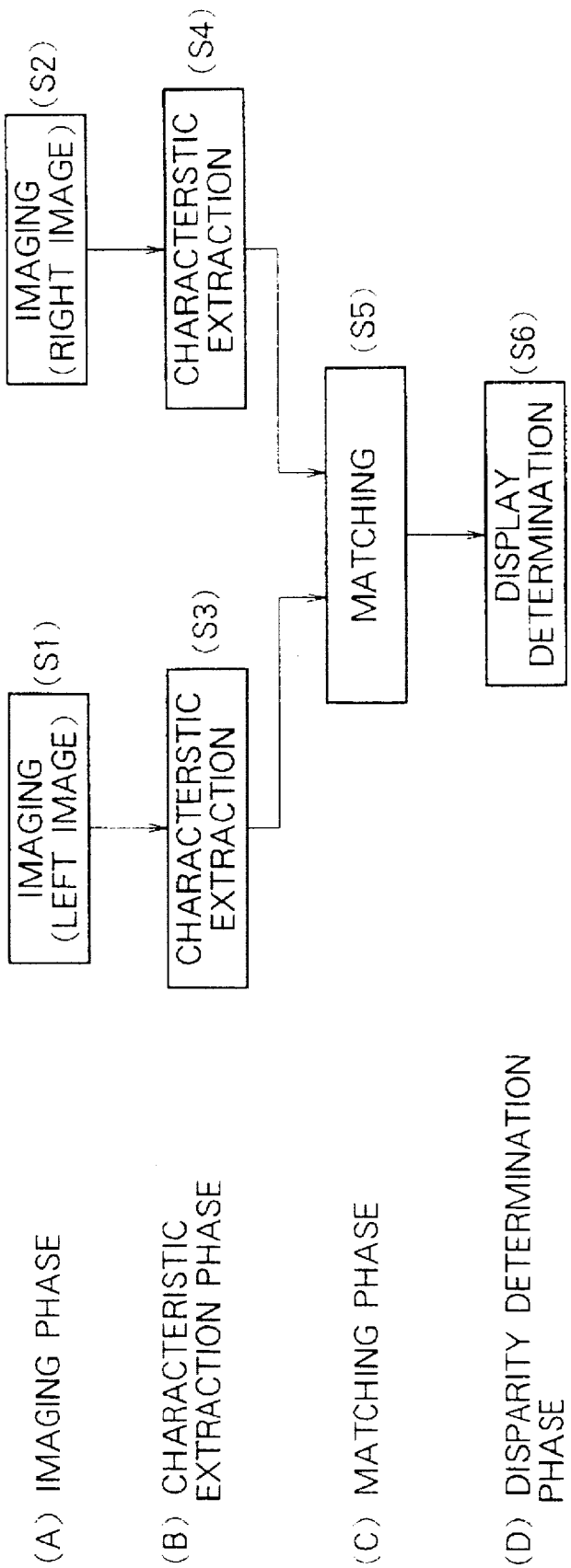
FIG. 3 is a flowchart for explaining the flow of operations from acquisition of stereo images to the measurement of the disparity by block according to an embodiment of the invention.

FIG. 3 is a flowchart for explaining the flow of operations from acquisition of stereo images to disparity measurement by block according to an embodiment of the invention. First, two right and left images (S1, S2) are obtained by two imaging devices at imaging phase (A). The right and left images obtained at imaging phase (A) are applied to characteristic extraction phase (B) where the characteristics of the images are extracted (S3, S4). At the subsequent stereo phase (C), the two right and left characteristic images are matched (S5). At the stereo phase (C), by scanning one window over one of the characteristic images as a reference according to a predetermined scanning rule, the window, which provides a unit of matching, is sequentially set, and matching with the other characteristic image is performed for each window thus set. The disparity determination phase (D) divides one of the characteristic images providing a reference into blocks of a predetermined size, and a histogram is generated using the disparity obtained by matching the windows contained in each block. A disparity at the histogram peak is determined as a disparity of the particular block (S6). The processes performed at each phase will be described in more detail below.

(A) Imaging phase

Figure 1:
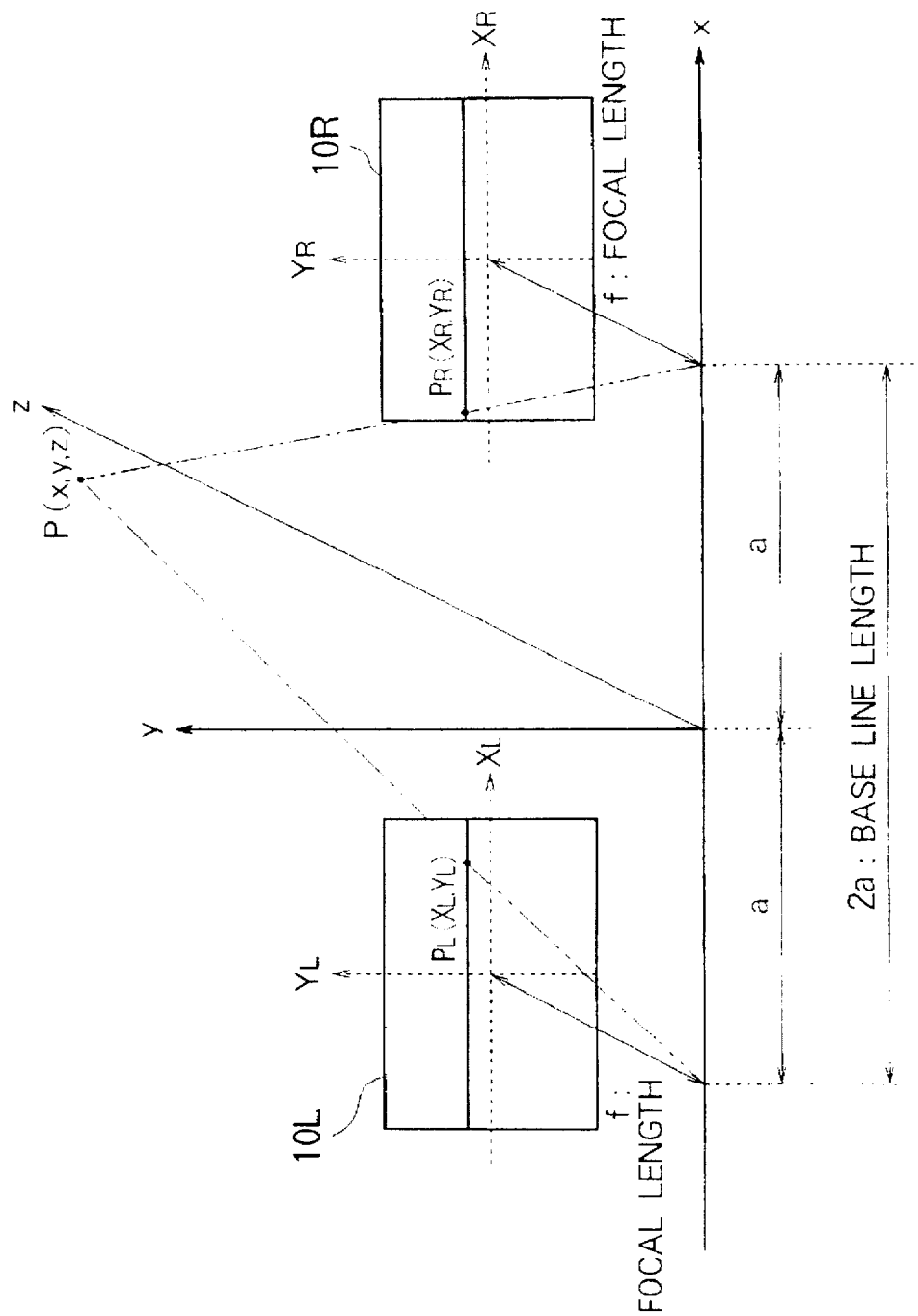
FIG. 1 is a diagram for explaining the principle of stereo image measurement.
Figure 2:
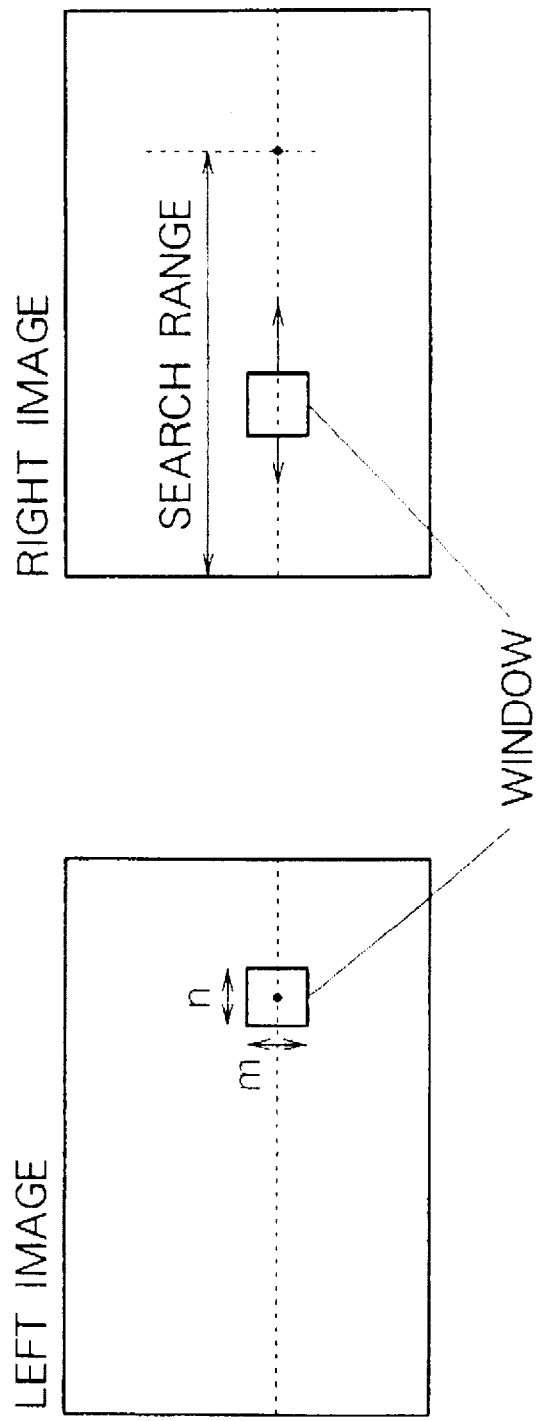
FIG. 2 is a diagram for explaining a conventional method of stereo matching and a conventional method of measuring the disparity.

The stereo camera system may be configured in various ways. According to the present embodiment, right and left cameras are arranged in parallel (two cameras are arranged at right and left sides in horizontal direction with the optical axes thereof parallel to each other). FIG. 1 shows an ideal parallel arrangement of right and left cameras. Actually, however, it is difficult to arrange two cameras 10L, 10R without being displaced from the ideal positions, and it is therefore important to provide some flexibility to the method of stereo matching or disparity measurement of stereo images to allow for some displacement.

Also, although the description of embodiments given below refers to a monochromatic image of 768×480 in size as an example of right and left images obtained at imaging phase (A), the present invention is not confined to such a case. The left and right images obtained at imaging phase (A) are assumed to be Left image: IL(x,y)

Figure 4:
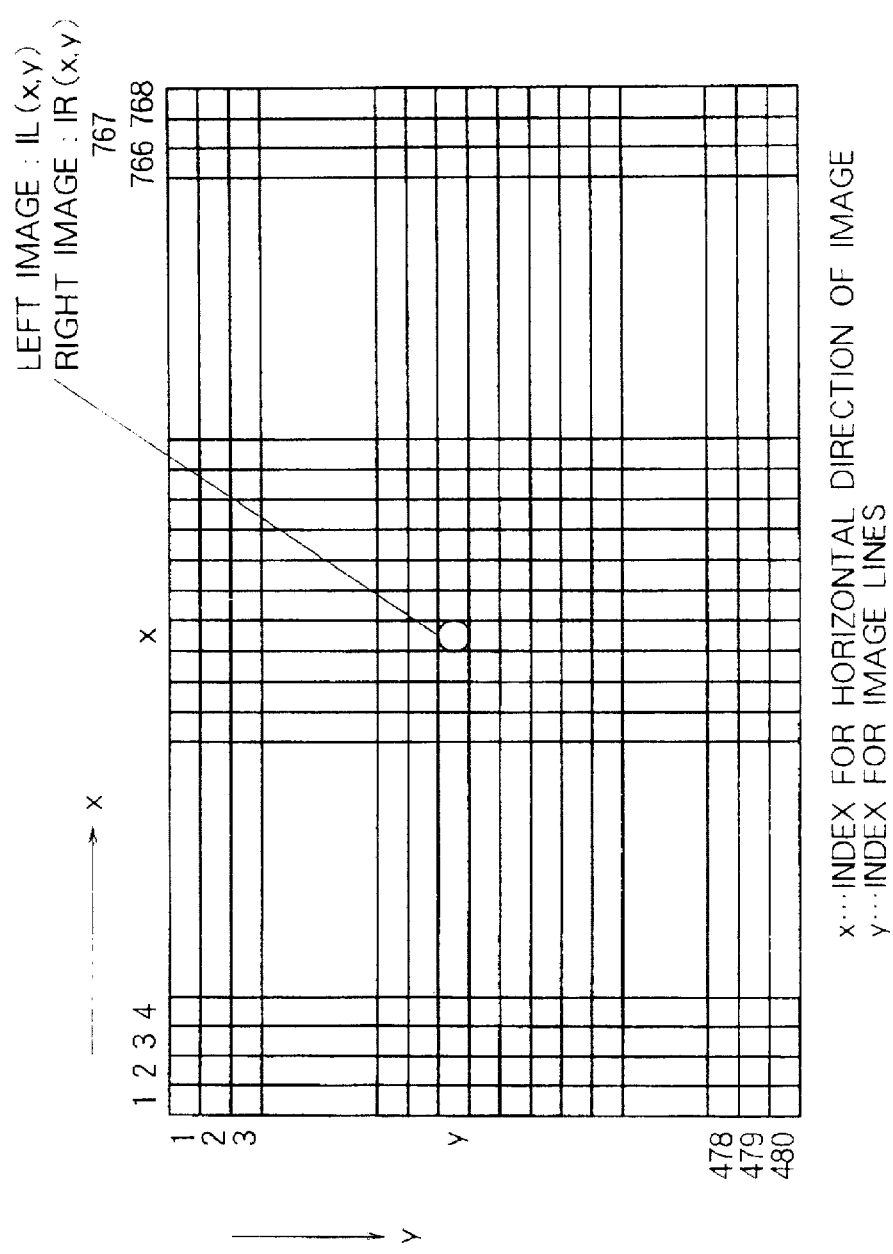
FIG. 4 is a diagram showing an example image used in an embodiment of the invention.

Right image: IR(x,y)

where $1 \leq x \leq 768$, $1 \leq y \leq 480$ and $0 \leq IL(x,y) \leq 255$, $0 \leq IR(x,y) \leq 255$ As shown in FIG. 4, x designates an index along the horizontal direction of the image and y an index along the lines of the image.

(B) Characteristic extraction phase

Figure 5A:
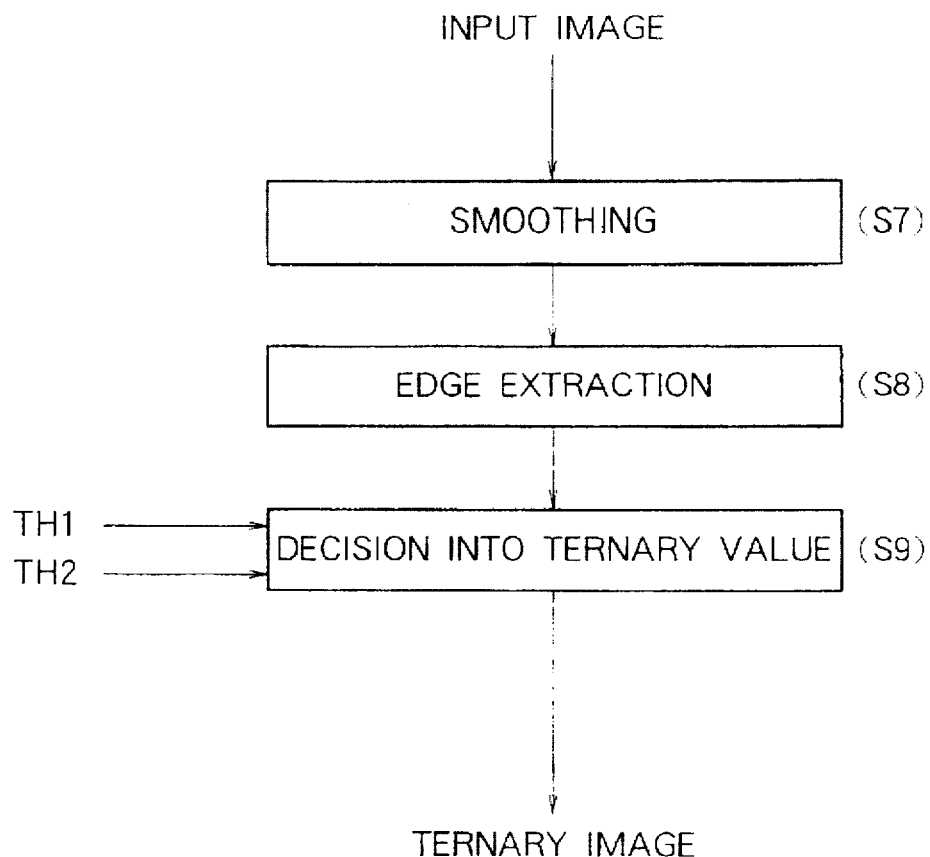
FIG. 5A is a flowchart of operations for the characteristic extraction phase according to the invention.

FIG. 5A shows the flow of process for characteristic extraction phase (B). The image input to characteristic extraction phase (B) is obtained at imaging phase (A).

First, the input image is applied to a smoothing step (S7) where high-frequency noise components of the image are reduced through a smoothing filter. The smoothing filter may be a spatial filter having the coefficients:

|   |   |   |
|---|---|---|
| 1 | 1 | 1 |
| 1 | 2 | 1 |
| 1 | 1 | 1 | or a Gausian filter having the following characteristic:

$$G(x:\sigma) = \frac{1}{\sqrt{(2\pi)}\sigma} \exp\left(-\frac{x^2}{2\sigma^2}\right) \quad (6)$$

This smoothing step (S7), however, may be eliminated when the S/N ratio of the input image is satisfactory.

As the next step, the edge extraction step (S8) (differentiation) is effected for extracting vertical edges through an edge extraction filter. The edge extraction filter may be a Sobel filter (primary differentiation) having the coefficients:

|   |   |    |
|---|---|----|
| 1 | 0 | -1 |
| 2 | 0 | -2 |
| 1 | 0 | -1 | or a Laplacian filter (secondary differentiation) having the coefficients:

|   |    |   |
|---|----|---|
| 0 | 1  | 0 |
| 1 | -4 | 1 |
| 0 | 1  | 0 |

The image subjected to the smoothing step (S7) and the edge extraction step (S8) has the DC components and high-frequency components (mainly, noise components) thereof removed. More specifically, the combination of the smoothing step and the edge extraction step is equivalent to a band-pass filter. The image, therefore, may alternatively be decided into a ternary value after being applied through a band-pass filter having the following characteristic:

$$\frac{\partial^2}{\partial x^2} G(x:\sigma) = \frac{1}{\sqrt{(2\pi)}\sigma} \left(\frac{x^2-\sigma^2}{\sigma^4}\right) \exp\left(-\frac{x^2}{2\sigma^2}\right) \quad (7)$$

Vertical edges are extracted due to the fact that the parallel arrangement of right and left stereo cameras generates the disparity only in the horizontal direction.

Further, the image subjected to the edge extraction step is decided into a ternary value by pixel (S9) in the following manner, for example, by a positive threshold value TH1 and a negative threshold value TH2.

Figure 5B:
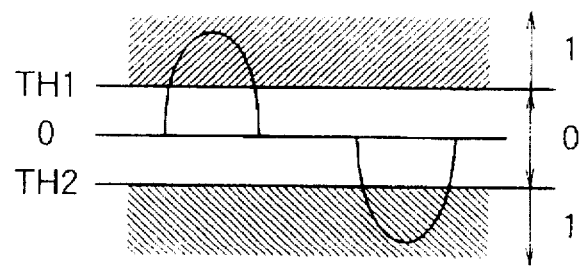
FIG. 5B is a diagram showing a method of deciding the image signal into a ternary value.

As illustrated in FIG. 5B,
 −1 for pixels less than TH2
 0 for pixels not less than TH2 but less than TH1
 1 for pixels not less than TH1

The ternary image (three-valued image) assumes −1 or 1 at an edge and 0 at a non-edge portion. In other words, a ternary image is assumed to include
 Left ternary image: FL(x,y)
 Right ternary image: FR(x,y)
 where $1 \leq x \leq 768$, $1 \leq y \leq 480$ and $-1 \leq FL(x,y) \leq 1$, $-1 \leq FR(x,y) \leq 1$ The ternary images are applied to the subsequent stereo matching phase (C) where the right and left ternary images are matched with each other.

(C) Stereo matching phase

Figure 6:
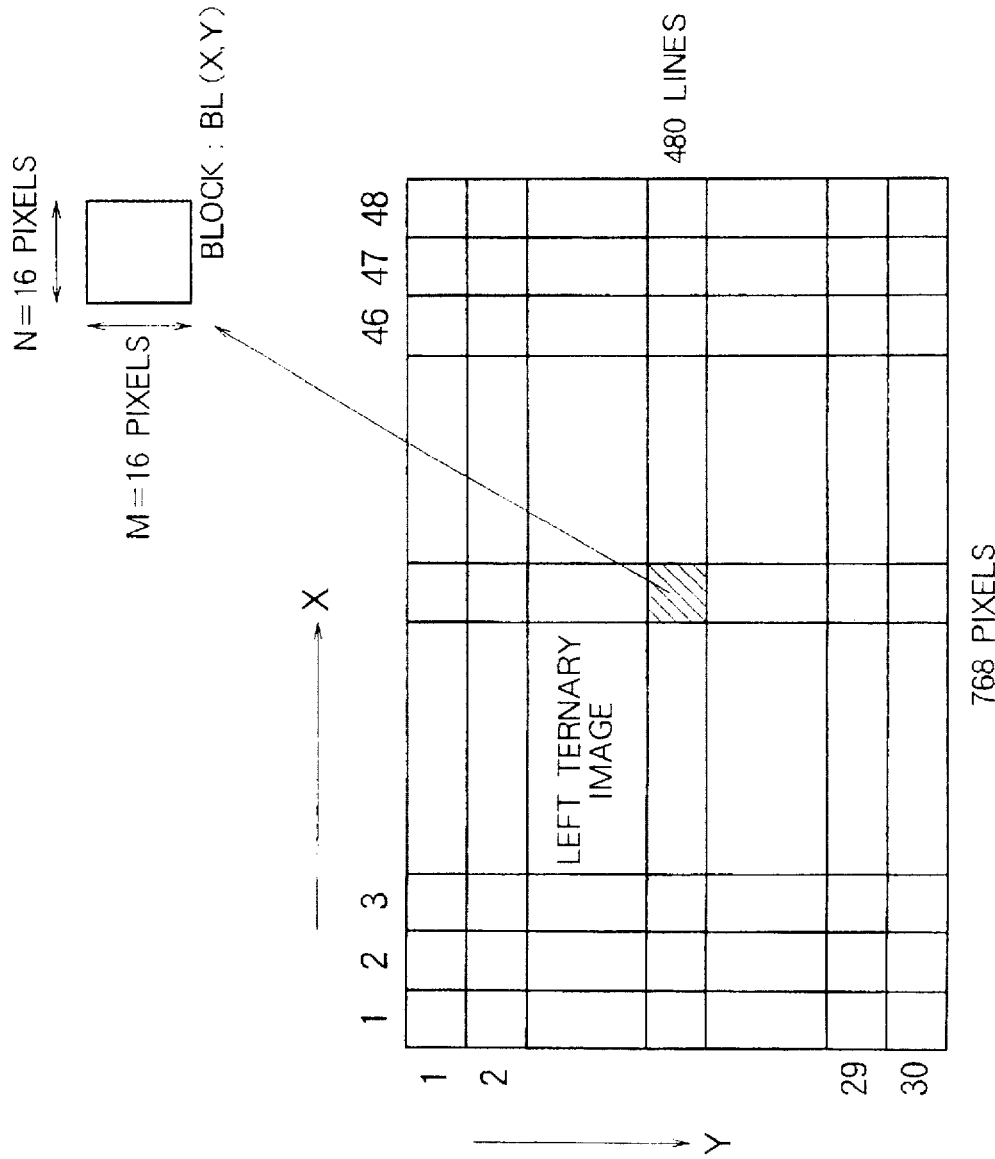
FIG. 6 is a diagram for explaining a method of dividing into blocks constituting a unit of disparity measurement according to the invention.

Stereo matching phase (C) matches the right and left images with each other using right and left images three-valued at characteristic extraction phase (B). In the stereo matching phase, one of the images is used as a reference to search the other image for a matching area. The embodiment under consideration is concerned with the case where the left image is used as a reference. First, as shown in FIG. 6, the left ternary image providing a reference is divided into blocks of N×M pixels in size. According to this embodiment, both N and M assume 16 so that the image is divided into 16×16 pixels in size. As a result, the left ternary image is split into 48 horizontal areas and 30 vertical areas for a total of 1440 blocks. A block identifier of BL(X,Y) will be used hereinafter. The left block identifier, for example, is expressed as BL(X,Y), where $1 \leq X \leq 48$ and $1 \leq Y \leq 30$.

A specific example method of matching will be explained. According to the embodiment under consideration, matching is effected only for odd-numbered lines (the scanning lines intended for matching are specifically called object scanning lines), and the information on even-numbered lines are not utilized at all after the stereo matching phase (C).

Next, as shown in FIGS. 7A to 7C, one-dimensional windows having a size of 16 pixels in the horizontal direction are moved while being overlapped each eight pixels on odd-numbered lines (object scanning lines) of the left ternary image. Consequently, the window scanning for each object scanning line sets 95 windows, and a matching candidate area is determined from the right tertiarized image for each window thus set.

Figures 8A, 8B, 8C:
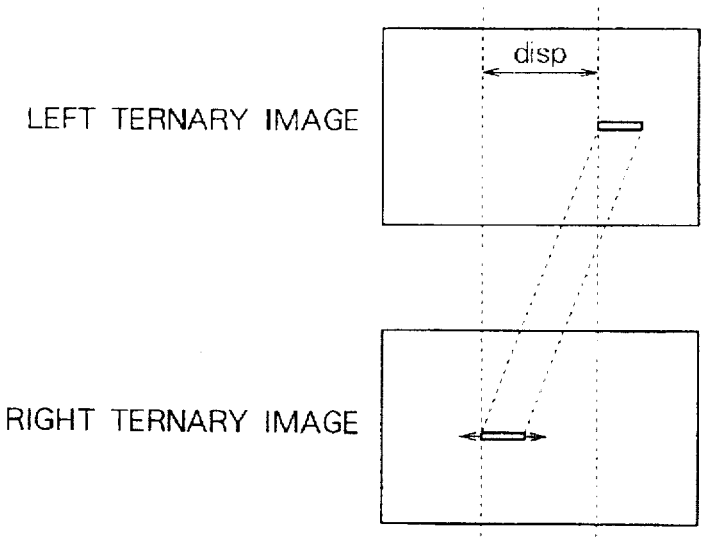
FIG. 8A is a diagram showing a matching area search of windows constituting a unit of matching according to the invention.
FIGS. 8B and 8C are diagrams for explaining a method of evaluating the degree of coincidence between images.

The matching candidate area, as shown in FIG. 8A, is determined up to second candidates for each window. The disparity or displacement for the area with the highest degree of coincidence is assumed to be the first candidate disparity (disp1), and the disparity for the area having the next highest degree of coincidence to be the second candidate disparity (disp2).

Also, a flag representing an edge distribution within each window is created for each window. The first and second candidate disparities obtained by homologization for each window as described above are disparity candidates but not the final disparities. The final disparities are determined using the first candidate disparity and the second candidate disparity for each of the divided blocks at the subsequent disparity determination phase.

Now, a method of evaluating the degree of coincidence and a method of creating a flag will be explained.

A method of evaluating the degree of coincidence will be explained with reference to FIG. 8B. The degree of coincidence is evaluated by making comparison between the 16 pixels in the one-dimensional horizontal window of 16 pixels in size set on the left ternary image providing a reference and the 16 horizontal pixels present in the range of the right ternary image where a matching area is likely to exist. More specifically, evaluation is effected for each of the 16 pixels in the window according to the evaluation method shown in FIG. 8C, and the following relation is determined from the result of evaluation of the 16 pixels.

$$\text{Coincidence evaluation function } E = \quad (8)$$
$$(\text{Number of "}P\text{"}) + (\text{Number of "}Z\text{"}) \leq 16$$

The larger the coincidence evaluation function E, the coincidence is evaluated to be higher in degree. Also, the number of "P" in equation (8) represents the number of coincident pixels for the edges characteristic of matching. It is assumed that the larger the number of coincident pixels, the higher the reliability of matching result, and vice versa. In the case where the number of "P" obtained as the result of coincidence evaluation for the first candidate disparity is smaller than a threshold value TH3, therefore, an erroneous matching can be reduced by invalidating the particular candidate disparity.

This method of coincidence evaluation, as compared with the conventional method of evaluation given in equation (5), has the amount of required computations remarkably reduced.

(1) Matching by window

In the method of equation (5), the disparity is measured for each pixel. More specifically, an area of n×m in size is set around a pixel constituting an object of disparity measurement, and an area most analogous (as evaluated according to equation (5)) is determined from the other image. The coordinate point of this area is used to determine the disparity of the pixels intended for measurement.

According to the method of the present embodiment, on the other hand, a disparity candidate is determined for each window overlapped by eight pixels.

(2) One-dimensional evaluation

In the conventional method according to equation (5), the degree of coincidence for a two-dimensional area of n×m in size is evaluated, while according to the method of the present embodiment concerns the comparison of a one-dimensional area (16 pixels in horizontal direction, for example).

(3) Comparison of ternary values

As compared with the conventional method of equation (5) requiring the addition, subtraction, multiplication and division of 8 bits, the operation in the method according to the present embodiment basically is a simple comparison of 2 bits.

Figure 9:
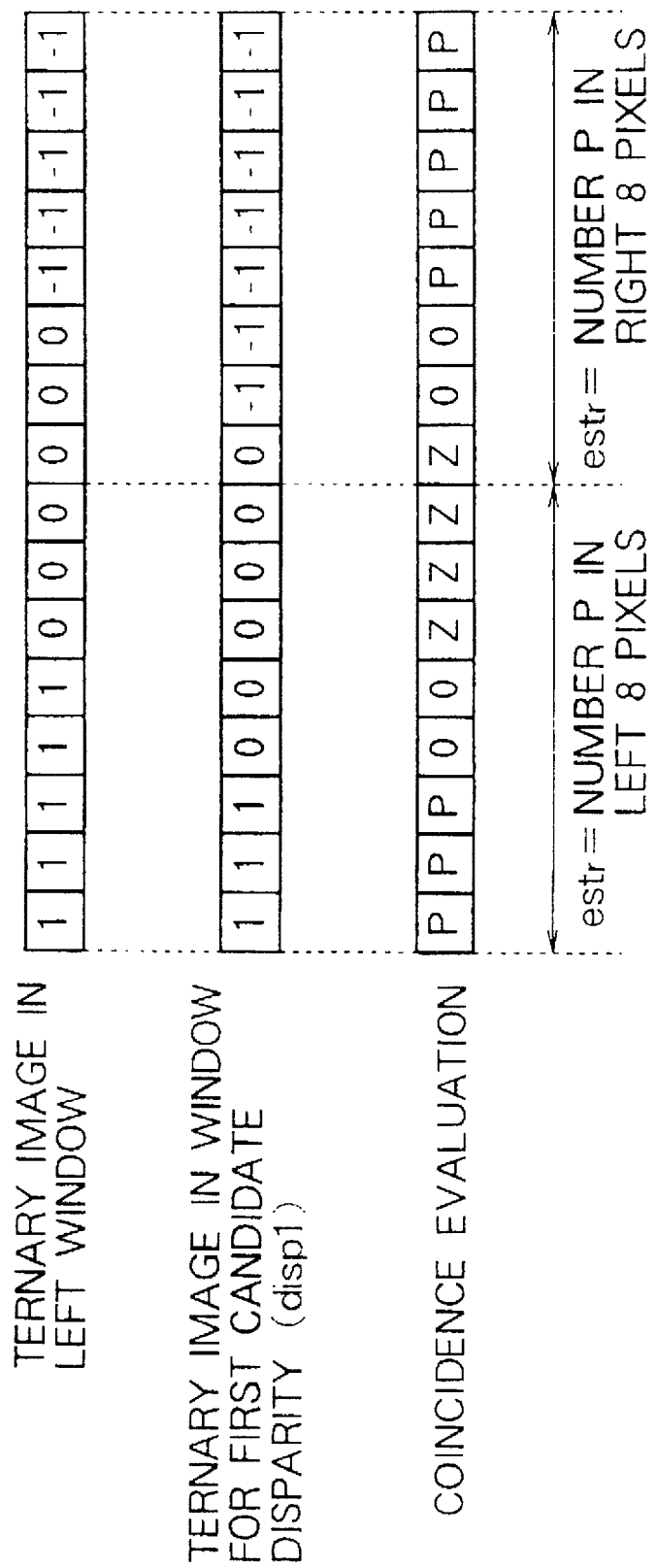
FIG. 9 is a diagram for explaining a method of generating a flag for the windows constituting a unit of matching according to the invention.

A method of creating a flag for a window providing a unit of matching will be explained with reference to FIG. 9. The disparity for an area, which is associated with the highest degree of coincidence as determined in the search for a matching area executed for each one-dimensional window of 16 pixels in size moved while being overlapped eight pixels on the left ternary image, constitutes the first candidate disparity (disp1). The number of pixels determined as "P" among the eight pixels on the left half of the 16 pixels is given as "$est_l$", and the number of pixels determined as "P" among the eight pixels on the right half as "$est_r$". In the process, a flag is created in the following manner.

Flag dispF=0 when $est_l \geq est_r$
Flag dispF=1 when $est_l < est_r$

The flag thus created roughly represents an edge distribution in the window set for the left ternary image intended for matching search.

When dispF=0, more edges are contained in the left eight of the 16 pixels in the window.

When dispF=1, more edges are contained in the right eight of the 16 pixels in the window.

In another method of flag creation, the number of −1 and 1 pixels present in the eight left-half pixels of the 16 pixels in the one-dimensional window is assumed to be edgl, and the number of −1 and 1 pixels among the eight right-half pixels to be edgr, with a flag being created as follows.

When $edg_l \geq edg_r$, flag dispF=0
When $edg_l < edg_r$, flag dispF=1

The flag thus created is used for determining the disparity of blocks at the subsequent disparity determination phase.

Figure 10:
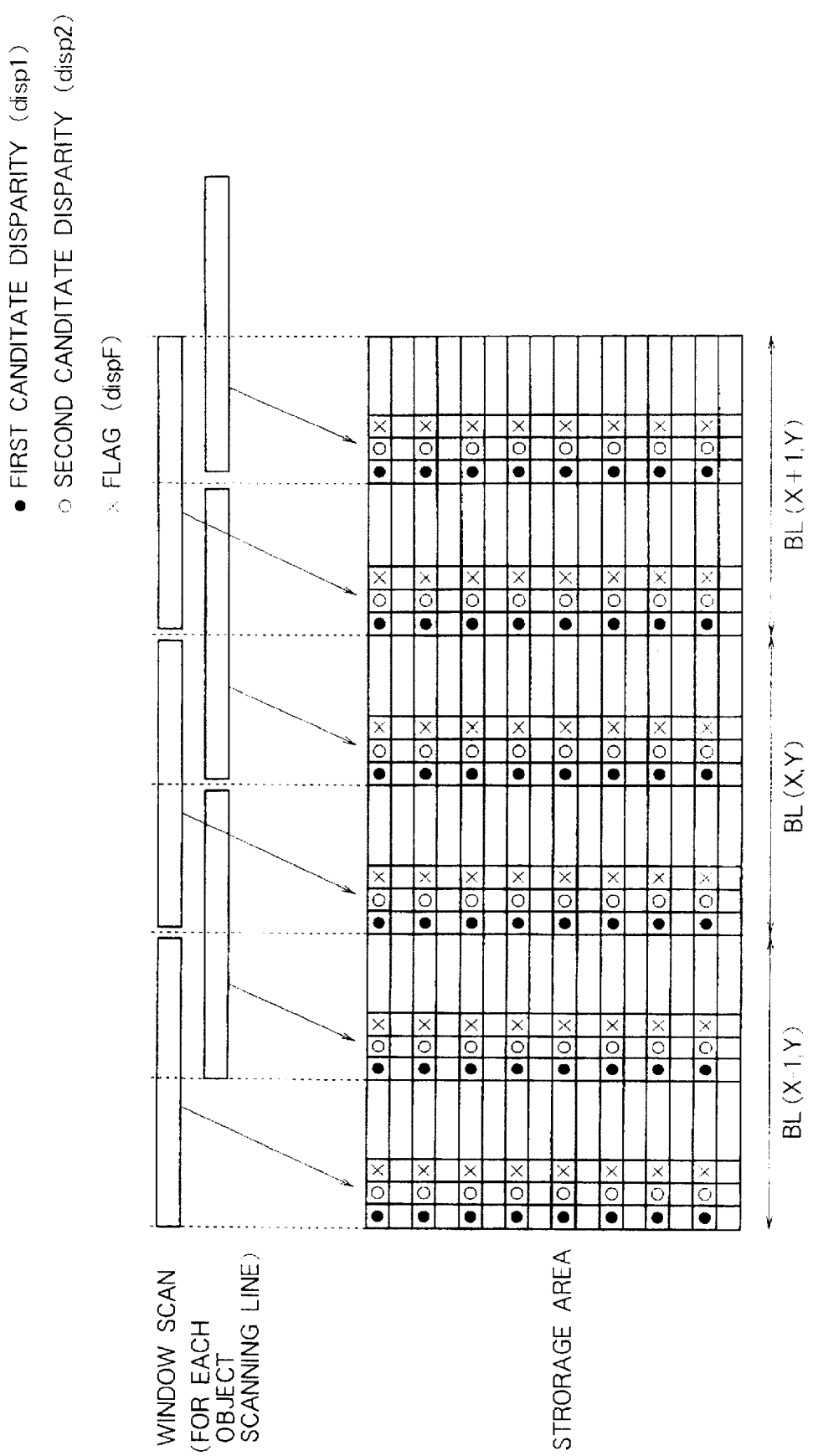
FIG. 10 is a diagram for explaining a method of storing the first candidate disparity, the second candidate disparity and the flag for the windows constituting a unit of matching according to the invention.

Now, the first candidate disparity (disp1), the second candidate disparity (disp2) and the flag (dispF) determined for each window scanned while being overlapped eight pixels on odd-numbered lines of the left ternary image are stored in a storage memory as shown in FIG. 10, for example. In FIG. 10, however, the storage area is plotted in a manner to facilitate the understanding of the homology with the image, although the blank portion is not required actually.

(D) Disparity determination phase

Disparity determination phase (D) determines the disparity for each of the blocks (1440 blocks) using the first candidate disparity (disp1), the second candidate disparity (disp2) and the flag (dispF) determined for each window at stereo matching phase (C).

A method of determining the disparity of a block will be explained. FIGS. 11A and 11B are diagrams for explaining a method of determining the disparity of block BL(X,Y). Determination of the disparity of block BL(X,Y) uses the first candidate disparity (disp1), the second candidate disparity (disp2) and the flag (dispF) stored in the dashed line of FIG. 11A (24 sets in total in this embodiment). The first candidate disparity (disp1) and the second candidate disparity (disp2) present in the dashed line are determined by matching a window containing at least eight pixels in block BL(X,Y).

Nevertheless, all the first candidate disparities (disp1) and the second candidate disparities (disp2) in the dashed line are not used, but they are selectively used on the basis of the flag (dispF) information.

A specific method will be explained with reference to FIGS. 11A and 11B. By way of explanation, the first candidate disparity, the second candidate disparity and the flag determined by matching a window containing 16 pixels in block BL(X,Y) are designated as disp1(X,Y), disp2(X,Y) and dispF(X,Y) respectively. According to this embodiment, only odd-numbered lines constitute object scanning lines, and therefore eight sets of disp1(X,Y), disp2(X,Y) and dispF(X,Y) are present in the block. Also, the first candidate disparity, the second candidate disparity and the flag determined by the matching of a window containing eight left pixels in block BL(X,Y) are designated as disp1(X−0.5,Y), disp2(X−0.5,Y) and dispF(X−0.5,Y) respectively. Eight sets of them are similarly present. Further, the first candidate disparity, the second candidate disparity and the flag determined by matching a window containing the right eight pixels in block BL(X,Y) are designated as disp1(X+0.5,Y), disp2(X+0.5,Y) and dispF(X+0.5,Y) respectively, of which eight sets are present as in the preceding case.

A histogram is generated according to the following procedure from the first candidate disparity, the second candidate disparity and the flag defined in the dashed line.

(1) First, disp1(X,Y) and disp2(X,Y) are unconditionally incorporated in the histogram.

Where disp1(X,Y) and disp2(X,Y) are disparity information obtained by matching a window containing the 16 pixels present within block BL(X,Y).

(2) When dispF(X,Y)=0, disp1(X−0.5,Y) and disp2(X−0.5,Y) are incorporated into the histogram.

The expression dispF(X,Y)=0 indicates that there are many edges in the left eight pixels of block BL(X,Y). In view of the fact that the degree of edge coincidence is crucial in the evaluation of the degree of coincidence, the disparity information obtained by matching a window containing the left eight pixels of block BL(X,Y) and the right eight pixels of block BL(X−1,Y) is used for determining the disparity for the blocks.

(3) When dispF(X,Y)=1, disp1(X+0.5,Y) and disp2(X+0.5,Y) are incorporated into the histogram.

The relation dispF(X,Y)=1 indicates that there are many edges in the right eight pixels of block BL(X,Y). The disparity information obtained by matching a window containing the right eight pixels of block BL(X,Y) and the left eight pixels of block BL(X+1,Y) is used for determining the disparity between the blocks.

(4) The process specified in (1) to (3) above is performed for the eight object scanning lines within the dashed line.

A histogram of the disparity is generated according to the above-described procedure, and a disparity a peak of the histogram thus generated is used as the disparity of block BL(X,Y).

By using the disparity at the peak of the histogram as the disparity of block BL(X,Y), an error which may occur in the matching operation executed for each window (or an erroneous candidate disparity which may be measured) can be absorbed appropriately.

The foregoing is an explanation of the processes from acquisition of stereo images to disparity measurement according to an embodiment of the invention. This embodiment is concerned with the case using only odd-numbered lines as object scanning lines. A similar result is expected when even-numbered lines are used. In the case where all the lines are used as object scanning lines, the reliability of disparity measurement is expected to improve although the amount of processing almost doubles that of the present embodiment. Further, the present invention is not of course confined to the window size N of 16 pixels in horizontal direction and the block size N×M of 16×16 pixels, as employed in the present embodiment.

It will thus be understood from the foregoing description that according to the present invention, there is provided a method of stereo matching and a method of disparity measurement of stereo images, in which the amount of computations is remarkably reduced as compared with the conventional method, and therefore the disparity of the whole screen can be measured within a short length of time from the sequentially-input stereo images. In addition, an apparatus can be constructed with low cost. Further, the reliability of the final disparity measurement is improved. As a result, an industrial monitoring system including an apparatus for detecting obstacles or intruders in a railway crossing can be realized commercially in which the disparity is measured and the disparity change monitored continuously from sequentially-input stereo images.

I claim:

1. A method for taking correspondence between right and left stereo images imaged by two imaging devices arranged at a predetermined horizontal distance therebetween, comprising the steps of:

extracting horizontal edges from the right and left stereo images by using differentiation;

deciding a level of each pixel of the extracted horizontal edges into a ternary value by using a first threshold value and a second threshold value; and determining a position in one of the right and left stereo images corresponding to that in the other of the right and left stereo images on the basis of the ternary values obtained through said deciding step, wherein said determining step includes setting a one-dimensional window having a size of N pixels along a horizontal direction in one of the right and left stereo images.

2. The method according to claim 1, further comprising the step of:

reducing noise components of the right and left stereo images by using a low-pass filter before said extracting step.

3. A method for taking correspondence between right and left stereo images imaged by two imaging devices arranged at a predetermined horizontal distance therebetween, comprising the steps of:

reducing out-of-band frequency components of the right and left stereo images by using a band-pass filter to extract horizontal edges having in-band frequency components from the right and left stereo images;

deciding a level of each pixel of the extracted horizontal edges into a ternary value by using a first threshold value and a second threshold value; and determining a position in one of the right and left stereo images corresponding to that in the other of the right and left stereo images on the basis of the ternary values obtained through said deciding step, wherein said determining step includes setting a one-dimensional window having a size of N pixels along a horizontal direction in one of the right and left stereo images.

4. The method according to claim 1, wherein said determining step includes the step of:

searching, in the other of the right and left stereo images, an area having a pattern of N ternary values which is analogous to that of said one-dimensional window.

5. The method according to claim 2, wherein said determining step includes the step of:

searching, in the other of the right and left stereo images, an area having a pattern of N ternary values which is analogous to that of said one-dimensional window.

6. The method according to claim 3, Wherein said determining step includes the step of:

searching, in the other of the right and left stereo images, an area having a pattern of N ternary values which is analogous to that of said one-dimensional window.

7. The method according to claim 4, wherein said determining step includes the step of:

evaluating a degree of coincidence of said pattern of N ternary values between the right and left stereo images by using a coincidence evaluation factor $E=Np+Nz+Nm$ for each one-dimensional window, where Np is a number of pixels each having a level not less than the first threshold value in both the right and left stereo images. Nz is a number of pixels each having a level less than the first threshold value and not less than the second threshold value in both the right and left stereo images, and Nm is a number of pixels each having a level less than the second threshold value in both the right and left stereo images.

8. The method according to claim 5, wherein said determining step includes the step of:

evaluating a degree of coincidence of said pattern of N ternary values between the right and left stereo images by using a coincidence evaluation factor $E=Np+Nz+Nm$ for each one-dimensional window, where Np is a number of pixels each having a level not less than the first threshold value in both the right and left stereo images. Nz is a number of pixels each having a level less than the first threshold value and not less than the second threshold value in both the right and left stereo images, and Nm is a number of pixels each having a level less than the second threshold value in both the right and left stereo images.

9. The method according to claim 6, wherein said determining step includes the step of:

evaluating a degree of coincidence of said pattern of N ternary values between the right and left stereo images by using a coincidence evaluation factor $E=Np+Nz+Nm$ for each one-dimensional window where Np is a number of pixels each having a level not less than the first threshold value in both the right and left stereo images. Nz is a number of pixels each having a level less than the first threshold value and riot less than the second threshold value in both the right and left stereo images, and Nm is a number of pixels each having a level less than the second threshold value in both the right and left stereo images.

10. The method according to claim 7, wherein said evaluating step includes the step of:
   determining that the coincidence of said pattern of N ternary values between the right and left stereo images is valid when Np+Nm is not less than a predetermined number.

11. The method according to claim 8, wherein said evaluating step includes the step of:
   determining that the coincidence of said pattern of N ternary values between the right and left stereo images is valid when Np+Nm is not less than a predetermined number.

12. The method according to claim 9, wherein said evaluating step includes the step of:
   determining that the coincidence of said pattern of N ternary values between the right and left stereo images is valid when Np+Nm is not less than a predetermined number.

13. The method according to claim 1, wherein said determining step includes the steps of:
   searching, in the other of the right and left stereo images, an area of the highest degree of coincidence with a pattern of N ternary values in said one-dimensional window and an area having the next highest degree of coincidence with the pattern of N ternary values in said one-dimensional window;
   designating disparity in the area having the highest degree of coincidence as the first candidate disparity and disparity in the area having the next highest degree of coincidence as the second candidate disparity; and
   determining disparity of the right and left stereo images by using said first candidate disparity and said second candidate disparity.

14. The method according to claim 2, wherein said determining step includes the steps of:
   setting a one-dimensional window having a size of N pixels along a horizontal direction in one of the right and left stereo images;
   searching, in the other of the right and left stereo images, an area of the highest degree of coincidence with a pattern of N ternary values in said one-dimensional window and an area having the next highest degree of coincidence with the pattern of N ternary values in said one-dimensional window;
   designating disparity in the area having the highest degree of coincidence as the first candidate disparity and disparity in the area having the next highest degree of coincidence as the second candidate disparity; and
   determining disparity of the right and left stereo images by using said first candidate disparity and said second candidate disparity.

15. The method according to claim 3, wherein said determining step includes the steps of:
   searching, in the other of the right and left stereo images, an area of the highest degree of coincidence with a pattern of N ternary values in said one-dimensional window and an area having the next highest degree of coincidence with the pattern of N ternary values in said one-dimensional window;
   designating disparity in the area having the highest degree of coincidence as the first candidate disparity and disparity in the area having the next highest degree of coincidence as the second candidate disparity; and
   determining disparity of the right and left stereo images by using said first candidate disparity and said second candidate disparity.

16. The method according to claim 4, wherein:
   said setting step includes the step of sequentially setting the one-dimensional window having a size of N pixels by overlapping N/2 pixels while scanning the whole screen on scanning lines; and
   said determining step includes the step of determining a position in one of the right and left stereo images corresponding to that in the other of the right and left stereo images for each one-dimensional window thus set.

17. The method according to claim 4, wherein:
   said setting step includes the step of sequentially setting the one-dimensional window having a size of N pixels by overlapping N/2 pixels while scanning a whole screen on one of odd-numbered scanning lines and even-numbered scanning lines; and
   said determining step includes the step of determining a position in one of the right and left stereo images corresponding to that in the other of the right and left stereo images for each one-dimensional window thus set.

18. A method of measuring the stereo image disparity between right and left stereo images, said method comprising the steps of:
   deciding a level of each pixel in the right and left stereo images into a ternary value;
   dividing a whole screen of one of the right and left stereo images into two-dimensional blocks each having a size of N×M pixels;
   sequentially setting a one-dimensional window having a size of N pixels along a horizontal direction in one of the right and left stereo images;
   searching in the other of the right and left stereo images an area having the highest degree of coincidence with a pattern of N ternary values in said one-dimensional window and an area having the next highest degree of coincidence with the pattern of N ternary values in said one-dimensional window;
   designating disparity in an area having the highest degree of coincidence as the first candidate disparity and disparity in an area having the next highest degree of coincidence as the second candidate disparity in each one-dimensional window;
   generating a histogram of disparities by using at least one of said first candidate disparity and said second candidate disparity; and
   determining disparity at a peak of the histogram of the disparities as the stereo image disparity for each of said two-dimensional blocks.

19. The method according to claim 18 further comprising the step of:
   evaluating a degree of coincidence of said pattern of N ternary values between right and left stereo images by using a coincidence evaluation factor E=Np+Nz+Nm for each one-dimensional window, where Np is a number of pixels each having a level not less than the first threshold value in both the right and left stereo images, Nz is a number of pixels each having a level less than the first threshold value and not less than the second threshold value in both the right and left stereo images, and Nm is a number of pixels each having a level less than the second threshold value in both the right and left stereo images.

wherein said generating step includes the step of generating a histogram of the disparities by using Np+Nm in N/2 pixels of an area where the degree of coincidence is evaluated as maximum in the other of the right and left stereo images and Np+Nm in N/2 pixels of a right-half of said area.

20. The method according to claim 18 further comprising:

evaluating a degree of coincidence of said pattern of N ternary values between right and left stereo images by using a coincidence evaluation factor E=Np+Nz+Nm for each one-dimensional window, where Np is a number of pixels each having a level not less than the first threshold value in both the right and left; stereo images, Nz is a number of pixels each having a level less than the first threshold value and not less than the second threshold value in both the right and left stereo images, and Nm is a number of pixels each having a level less than the second threshold value in both the right and left stereo images.

wherein said generating step includes the step of generating a histogram by using Np+Nm in N/2 pixels of a left half of the one-dimensional window and Np+Nm in N/2 pixels of a right-half of the one-dimensional window.

21. A method for measuring stereo image disparity between right and left stereo images for each of a plurality of two-dimensional blocks having a rectangular shape, said method comprising the steps of:

deciding a level of each pixel in the right and left stereo images into a ternary value;

sequentially setting a one-dimensional window having a size of N pixels along a horizontal direction in one of the right and left stereo images by overlapping N/2 pixels;

determining disparity for each one-dimensional window by determining a portion in the other of the right and left stereo images corresponding to each one-dimensional window on the basis of the ternary value obtained through said deciding step, thereby generating a histogram of the disparities; and determining the stereo image disparity for each of said two-dimensional blocks on the basis of the histogram of the disparities.

* * * * *